FIG. 1    FIG. 2

INVENTOR.
JAMES A. DANIEL, JR.

March 17, 1970  J. A. DANIEL, JR  3,501,120
SUPPORTING LINKAGE FOR STRAIGHT LINE MOVEMENT
Filed Feb. 10, 1969                                    5 Sheets-Sheet 3

INVENTOR.
JAMES A. DANIEL, JR.

INVENTOR.
JAMES A. DANIEL, JR.

*INVENTOR.*
JAMES A. DANIEL, JR.

United States Patent Office 3,501,120
Patented Mar. 17, 1970

3,501,120
SUPPORTING LINKAGE FOR STRAIGHT
LINE MOVEMENT
James A. Daniel, Jr., R.D. 2, Box 66,
Newton, N.J. 07860
Continuation-in-part of application Ser. No. 601,096,
Dec. 12, 1966. This application Feb. 10, 1969, Ser.
No. 798,091
Int. Cl. A47f 5/08
U.S. Cl. 248—276                                   19 Claims

ABSTRACT OF THE DISCLOSURE

A linkage for translating straight line movement includes a traveller carried on a first elongated leg wtih two supporting arms pivoted to the leg. The arms are also pivotally connected to a support member. Means for keeping the traveller moving in a plane may include another supporting arm parallel to one of two supporting arms, and another leg parallel to the first leg. The supporting arms define sides of parallelograms.

---

This is a continuation-in-part of my copending application Ser. No. 601,096, filed Dec. 12, 1966 (now Patent No. 3,426,994 of Feb. 11, 1969), which in turn is a continuation-in-part of my copending application Ser. No. 469,175, filed July 2, 1965, now Patent No. 3,291,431.

The present invention relates to a supporting linkage for straight line movement which may be utilized in conjunction with the devices of my two prior above-identified applications as a weight or force supporting linkage. As in my two prior above-identified applications, the device of the present invention is capable of reciprocating in a straight line by the use of pivots and does not utilize rollers or members sliding in relation to one another.

Straight line carriers and supporting devices in general are well known and serve a great variety of purposes, e.g. "lazy-tong" devices are used for expandable and contractable gates; sliding telescoping parts are used for moving lenses in relation to one another and a telescope; rollers are used for sliding doors and desk drawers. Many mechanical devices require one element to move toward and away from another in a straight line. In general, the defects of the prior devices are that they are subject to excessive friction, breakage and jamming or binding. In addition, items such as rollers and bearings are relatively expensive.

The devices of my prior applications go a long way in overcoming the defects of the prior art. However, there is still need for a simple straight line movement linkage device capable of supporting a weight from fixed pivots with an equal balance (neutral equilibrium).

It is, therefore, an object of the present invention to overcome deficiencies in the prior art, such as those indicated above.

It is another object of the present invention to provide a supporting linkage for straight line movement.

It is another object of the present invention to provide a simplified supporting linkage which may be used in conjunction with a straight line carrier device, the combination containing no sliding or rolling members.

It is another object of the present invention to provide a supporting linkage which provides a movement solely through pivot points.

It is another object of the present invention to provide an apparatus which will move an object in a straight line toward and away from a base.

It is another object of the present invention to provide an extremely simple construction for effectuating the above objects, which apparatus is relatively inexpensive and simple to produce, but which requires for its success a critical relative size relationship between its elements.

Other objects and the nature and advantages of the instant invention will be apparent from the following detailed description of exemplary embodiments of the invention taken in conjunction with the accompanying drawings wherein.

Figures 3, 4, 5, 6, 7, 8, 9, 10, 11:
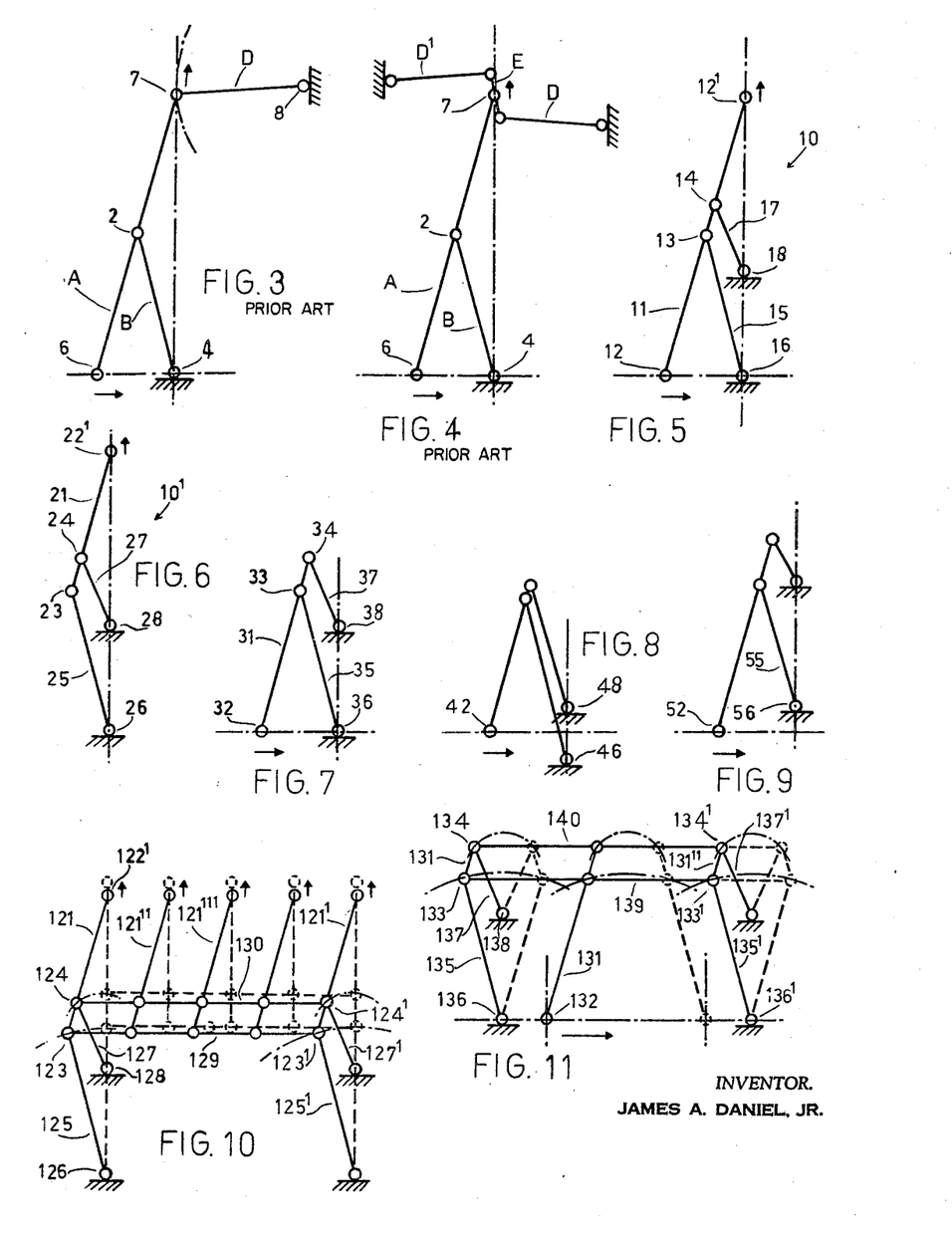
FIG. 3 is a representation of the prior art Evans' linkage.
FIG. 4 is a prior art representation of the Tchebicheff's combination of the Watt and Evans linkages.
FIG. 5 is a simplified representation of a device in accordance with the present invention similar to that shown in FIGS. 1 and 2 which carries two travellers.
FIG. 6 constitutes a construction in accordance with the present invention providing a short stroke vertical movement.
FIGS. 7-9 show variations of the simplified structure of the present invention providing horizontal movement of the traveller.
FIG. 10 constitutes a construction in accordance with the present invention utilizing a plurality of inter-connected elements and useful for vertical straight line movement.
FIG. 11 represents another embodiment of the present invention providing horizontal movement between two fixed bodies.

The present invention can best be understood by reference to certain known prior art. In FIG. 3 there is shown the prior art Evans' linkage which consists of a leg A, a supporting arm B which is pivoted thereto at a pivot 2 and a linkage D pivoted to the leg at a pivot 7. A traveller 6 is thereby capable of moving in a straight line as shown by the arrow. Support pivots 4 and 8 are provided anchoring the linkage to a suitable support. In the Evans' linkage, arc movement of the pivot 7 as shown by the arrow permits the traveller 6 to transcribe approximately a straight line; however, this very same arc movement prevents the path of movement of the traveller 6 from being a perfectly straight line.

Another prior art linkage shown in FIG. 4 is Tchebicheff's combination of the Watt and Evans mechanisms. This device also comprises a leg A and a supporting arm B connected at a pivot 2, the bottom of the leg carrying a traveller 6 and the arm being supported by a pivot 4. Since the upper pivot 7 must move in a straight line to cause the traveller 6 to also move in a straight line. Tchebicheff used at the upper end of his device a Watt linkage comprised of the links D, D' and E, all pivoted together. In the Watt linkage, the links D and D' must be of equal length and the pivot 7 must be located midway along the length of link E.

In the devices of both FIG. 3 and FIG. 4, the leg A is twice as long as the arm B and the pivot 2 is at precisely the mid-point of the leg A. While these devices were of significance in the past, that of FIG. 3 does not describe a precise straight line movement and the FIG. 4 and later devices, which do describe straight line motion, are more complicated. The present invention provides true straight line movement over short distance and yet is highly simplified as pointed out above, is strong, and is versatile.

Figure 2:
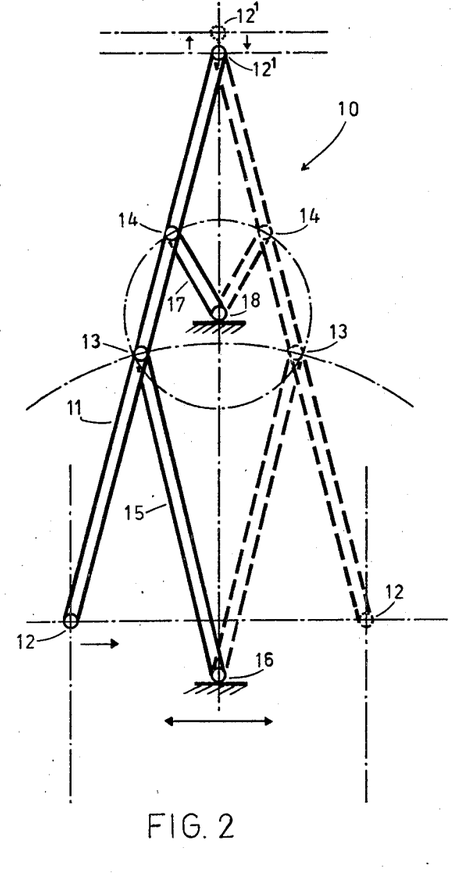
FIG. 2 is a representation showing the path of movement and approximate distances of portions of the device shown in FIG. 1.

As pointed out above, in the devices of both FIGS. 3 and FIG. 4 the leg A is twice as long the arm B and the pivot 2 is at precisely the mid-point of the leg A. The additional linkage D of FIG. 3 serves to restrain movement of the point 7 to an approximately straight vertical path. Similarly, in FIG. 4 the linkages D, E and D' serve to restrain the point 7 to a straight vertical path. Some similarity is seen in the device of FIG. 2 of my earlier Patent No. 3,291,431, similar linkages being shown by the bar 135 and 133 with the rod 132 providing a slot to restrain the pin 125 in a straight line of movement and the pin 125 being equivalent to point 7 referred to above; here the bar 135 is twice as long as bar 133 and bar 133 is pivoted at precisely the mid-point of bar 135. These devices are designed to cause the point 6 of FIGS. 3 and 4 (and the pivot 140, in relation to pivot 136, of FIG. 2 of Patent No. 3,291,431) to move in a straight path.

In the device of FIG. 4 and similar devices with a point equivalent to point 7 restrained to a straight vertical lnie of movement, the mid-point of leg A (pivot 2) is confined in its movement to an arc of a circle path by the arm B about the pivot 4. Arm B is the radius of the mid-point circular path and pivot 4 is at the intersecting point of a right angle produced by the travellers 6 and 7. Were the travellers 6 and 7. Were the traveller 6 restrained to a horizontal straight line of movement the point 7 would move in a vertical straight line without its restraint, e.g., the linkage D, E and D'. With the traveller 6 moving on a straight horizontal line, and point 7 moving on a straight vertical line, and the mid-point of leg A, pivot 2, moving on an arc of a circle, other points along the leg A move on a curved path.

It has been found that a segment of these curves are arcs of a circle for a distance on each side of a line produced by the vertical moving point, such as point 7. These arc of a circle segments are utilized in the present invention. Again referring to FIG. 4, were the arm B a radius for a circle segment for a point other than the mid-point 2 along the leg A, and pivoted between the leg A and a fixed pont along the vertical line of travel of point 7, the traveller 6 would transcribe a straight line, for the distance permitted by the arc of a circle segment, i.e., for the distance along the curved path that is an arc of a circle segment of that particular curved path. The device FIG. 4 of my Patent 3,291,431 illustrates the use of a radius that is not for the mid-point of a similar linkage. This device of Patent 3,291,431 restrains the travellers 60 and 62, which are analogous to the point 7 referred to above, to a straight line path by the use of parallelogram linkages, and the points 68, 70, 72 and 74 are held to an arc of a circle movement by the radius linkages 68–76, 70–76, 72–76 and 74–76. This results in the movement of the travellers 46, 50, 54 and 58 on a straight line path. Were the mid-point radiuses used in this device, the travellers 46 and 50 would be at the same point and the travellers 54 and 58 would be at one point, thus resulting in a device without a rigid support for a traveller.

The present invention involves the use of two supporting arms, whereas each arm represents a radius for an arc of a circle segment, and the two arcs define the path of movement of two particular pivot points along the elongated leg that are spaced apart; this affords a rigid support between the two points and maintains the predetermined path of movement for all points of the leg thus eliminating the need for a restraint, and as the slider of FIG. 4 of Patent 3,291,431, or the Watt's linkage (see FIG. 4). This results in a more simple device and a device of greater value in certain applications. The straight line movement is relatively short in comparison to the devices of Patent 3,291,431 and application Ser. No. 601,096. However, the present device has the advantages of greater support for the traveller and is so symmertrically balanced that the weight of a traveller is suspended in neutral equilibrium for the distance of the straight line movement along a horizontal level path.

Noting FIG. 2, for example, in its simple form a linkage construction 10 in accordance with the present invention comprises an elongated leg 11 with a tracing point or carrier 12 and 12' at either or both extremities thereof for movement in a straight line, the different locations being shown by a comparison of solid lines with phantom lines. It is seen that the tracing point or traveller 12 moves horizontally while the tracing point or traveller 12' moves vertically.

Along the length of the leg 11 is provided two support points or pivots 13 and 14. The elongated leg 11 is supported by a first supporting arm 15 pivoted at the first support point 13 by one extremity thereof, the supporting arm 15 being mounted to a suitable support by a suitable pivot 16. Instead of being directly connected to the leg 11, the arm 15 and leg 11 may be connected through suitable connecting members, such as described below in relation to FIGS. 10–12, 13, 16 and 17; when connecting members are used, as will be seen, a third or third and fourth supporting arms (a duplication of the simplified device here disclosed) are necessary.

At any rate, a second supporting arm 17 supports the elongated leg 11 at the pivot 14 and is itself supported at a suitable base or support member by a pivot 18. As is seen from the various figures, the supporting arms 15 and 17 are provided with the necessary pivots 13, 14, 16 and 18, preferably, at their extremities. As will be seen from FIG. 2 as well as the other figures, the second supporting arm 17 is shorter than the first supporting arm 15. Also, as described above, with regard to the first supporting arm 15, the second supporting arm 17 need not be directly connected to the elongated leg 11 but may be indirectly connected by means of suitable connecting members, described in more detail below, in which case more support (e.g., a third or fourth arm) is necessary to maintain parallelism.

Accordingly, in its most simplified form, a linkage construction 10 in accordance with the present invention constitutes only three elements pivoted together, the elongated leg 11, a first supporting arm 15, and a second supporting arm 17. When these elements are so chosen of proper length and spacing in a critical manner as disclosed below, it is seen in FIG. 2 that accurate straight line motion occurs, the travellers 12 and 12' moving in a straight path and the pivots 13 and 14 moving in arcs. All the figures being drawn precisely to scale, it is seen from FIG. 2 the precise path and approximate distance of straight line movement for a device 10 of given size.

For practical purposes the supporting arms are located along the leg with the first arm being placed at or in the vicinity of the mid-point and the second arm being placed above both the mid-point and the first arm. The application Ser. No. 601,096 FIGS. 4, 5, and 7 illustrates the use of linkages analogous to the elongated leg with a supporting arm mounted at the mid-point. Only the addition of a second supporting arm is required to provide greater support of the traveller as here shown in FIG. 16.

The precise radius and the precise focal point (i.e., circle center) of the arc of a circle segment, for a particular given point along the elongated leg, is obtained to determine the length of the supporting arm and the point of mounting to the support member. The length of the arm equals the length of the radius. The distance between the focal points determines the spacing between the two arms to the support member. Also the spacing to the support member can be determined by the simple equation of adding the distance between the first and second given points to the length of the first arm and subtracting the length of the second arm. This gives the spacing distance between the two arms for mounting to the support member. When a supporting arm is spaced a distance from the elongated leg by a connecting member, the spacing of the arm to the support member is moved a like distance in a manner to retain the parallel position of the supporting arm.

To obtain the precise radii and focal points for construction of the device, the elongated leg is placed at an angle to a vertical line (the long side of a right triangle) that represents the position of the leg when the device is in neutral position. Since the lengths of travel along the arcs of circle segments are not the same for any two points along the leg and the degree of the arcs of circle segments are not constant for points along the leg, the angle degree given below is a computation to place the leg within the scope of the arcs of circle segments for points along the leg that are most practical for use in this device. To place the leg closer to the center line (making the acute angle greater than 80°) would make it more difficult to determine the exact points.

Figure 1:
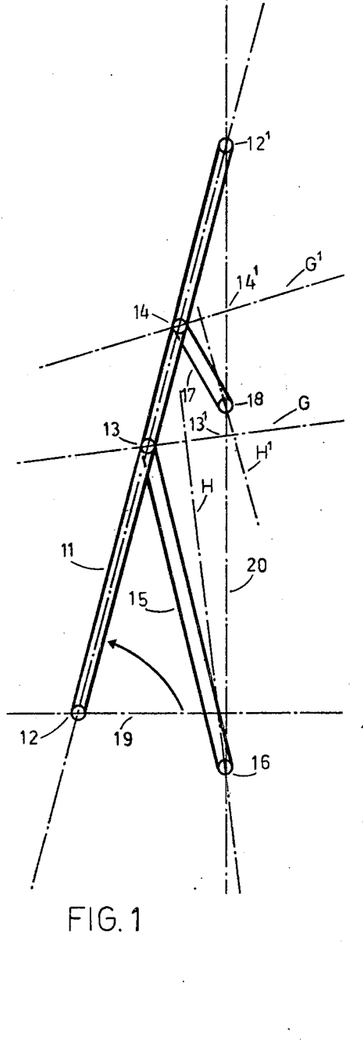
FIG. 1 illustrates how a unit in accordance with the present invention is constructed.

As pointed out above, the relative lengths and spacing of the elements are critical in accordance with the present invention. It is necessary to define the critical inter-relationships of the elements by setting forth a procedural formula which must be followed each time a device of different proportion of elements is manufactured. Reference to FIG. 1 in relation to the following formula will clarify the manner of obtaining simplified linkage construction for translating straight line motion in accordance with the present invention. This procedure determines the relative lengths of the first and second supporting arms, the distance between the first and second pivots (pivots 13 and 14) and the distance between the third and fourth pivots (pivots 16 and 18). It may incidentally be pointed out that in the simplified structure shown, the distance between the first and second pivots 13 and 14 plus the lengths of the first supporting arm 15 will equal the sum of the distance between the third and fourth pivots 16 and 18 and the length of the second supporting arm 17, although this will not necessarily produce the invention. The critical inter-relationships are determined by:

(1) Forming a right angle triangle wherein the elongated leg 11 corresponds to the hypotenuse and also having a short leg 19 and a long leg 20, the angle alpha (see FIG. 1) being approximately 75 to 80 degrees. As shown in FIGS. 1, 2 and 5, the elongated leg may correspond precisely to the hypotenuse or the elongated leg 11 may only form a portion of the hypotenuse noting, for example, FIGS. 6–9, discussed below. Also, the straight line traveller 12 or 12′ will be located at one of the vertices of the so formed triangle, although in the case wherein connecting member or members are used between the supporting arms and the elongated leg, the travellers or tracing points will be located only in a plane passing through one of the acute angle vertices of the triangle and either parallel to or coplanar with one of the sides of the triangle (as in FIGS. 10 and 11, discussed below).

(2) Next, a given exact distance is measured along the length of the hypotenuse 11 from the short side 19 to approximately the mid-point of the hypotenuse to define a first support point 13, it being understood that this point 13 need not be at the precise mid-point. Noting FIG. 2, it will be seen that point 13 lies on the circumference of a circle.

(3) An identical exact distance is then measured along the length of the long side 20 from the short side of the triangle to define a second point 13′; the first and second points 13 and 13′ are both on the circumference of a circle.

(4) A line G is then drawn between the two points 13 and 13′, this line G being a chord of the circle passing through points 13 and 13′.

(5) A perpendicular bisector H of the chord is then drawn so as to intersect the long side 20 of the triangle or an extension thereof at a third point 16 thereby defining the third pivot 16 between the first supporting arm 15 and the support member, the first point 13 defining the first pivot between the first supporting arm 15 and the elongated leg 11, with the distance between the first and third points, i.e., pivots 13 and 16, defining the length of the first supporting arm 15.

(6) Steps (2) and (3) are then repeated using a second given exact distance greater than in step (2) to obtain a fourth point 14, corresponding to the second pivot 14, and a fifth point 14′. Steps (4) and (5) are repeated to obtain the chord G′ and the perpendicular bisector H′ to thereby obtain a sixth point at the intersection between the bisector H′ and the long side 20, the sixth point defining the fourth pivot 18 between the second supporting arm 17 and a suitable support member, with the distance between the fourth and sixth points (i.e. the pivots 14 and 18) defining the length of the second supporting arm 17. In FIG. 2 the arm 17 is clearly shown as the radius of a circle, pivot 14 moving along an arc of a segment of the circle during use of the device.

The above procedure can be followed regardless of the absolute size of the elongated leg 11 and the exact location of the pivots 13 and 14.

The linkages formed and mounted according to the formula will not have the supporting arms parallel to each other or with the elongated leg except when the device is in the neutral position at the mid-point of the symmetrical movement of the device, when the leg is in vertical position. At the neutral position the elongated leg or legs and all supporting arms are parallel with one another regardless of the variation in proportions of the linkages or in the use of additional parallelogram linkages. In a simple device the three linkages are merged into one line at the neutral position. With the supporting arms mounted to the elongated leg or to a connecting member, and with the leg and arms parallel as in the neutral position; i.e., all straight up and down, the spacing of the arms to the support member is automatically correct.

Noting FIG. 5, it will be seen that this construction is very similar to that of FIG. 1 except that the pivot 13 is at the exact mid-point of the leg 11 so that the pivot 16 comes out at precisely the right angle vertex of the triangle. Basically, this structure provides the second supporting arm 17 which replaces the Watt linkage in the Tchebicheff combination of FIG. 4. The device 10 produces straight line movement in two directions, the precise linkages being variable as pointed out above. Either of the two straight line movements (12 or 12′) can be eliminated and the other one will remain effective.

The FIG. 5 embodiment comprises an elongated leg 11 with a point 12 adapted to move on a straight horizontal path, in a reciprocating stroke between points on each side of the vertical line, and a point 12′ to move straight up and down along the vertical line; and two supporting arms mounted to fixed pivots 16 and 17 and to the elongated leg at points 13 and 14. The first supporting arm 15 and the shorter second supporting arm 17 provides a rigid lateral support.

The present invention utilizes movement along the arcs of segments of two circles so disposed that the leg lying on a path passing through the center of the circle of each segment is mounted to a first and a second arm whereas the first and second arms correspond to the radii of the circles, such first and end arms being mounted to a base at points corresponding to the centers of the circles and resulting in a device wherein the extremities of the leg will move on straight line paths that are at right angles to each other.

For example, noting FIG. 6, it is seen that a device 10' similar to that of device 10 of FIG. 5 is shown in which the lower portion of the elongated leg 11 has been removed. Thus, an elongated leg 21 having a traveller 22' for vertical movement in a straight line is provided having a first supporting arm 25 and a second supporting arm 27, respectively connected thereto at pivots 23 and 24. The supporting arms are connected to a suitable support by the pivots 26 and 28 respectively. The device of FIG. 6 provides for short stroke vertical movement and may be used for an electric switch to provide straight-on contact points.

Noting FIG. 7, a very similar device to that of FIGS. 5 and 6 is provided, but wherein the top portion of the device of FIG. 5 has been eliminated. Here, a leg 31 is provided at its lower end with a traveller 32 which moves in a straight horizontal path, the elongated leg 31 being supported by first and second arms 35 and 37, respectively, at pivots 33 and 34, respectively. The arms 35 and 37 are in turn pivoted to a support at pivots 36 and 38, respectively.

The embodiment of FIG. 8 shows a variation of the embodiment of FIG. 7, the traveller 42 having a straight line path between fixed pivots 46 and 48. As in FIGS. 1 and 2, because of the selection of the first distance along the hypotenuse of the triangle, the pivot 46 becomes located below the plane of the short side of the triangle.

Likewise, in FIG. 9 the straight line path of traveller 52 is below the lower support pivot 56 for the first support arm 55. If, in the formula for obtaining the structure shown, the first selected distance along the hypotenuse is greater than half the length thereof, then the pivot 56 will result as shown lying above the path of the traveller 52. This gives clearance for the traveller below the support as shown in FIGS. 9, 12, 22, 23, 24, 25, and 26.

In all the embodiments discussed, the traveller is always mounted at one of the acute angle vertices of the triangle. In FIGS. 2, 5 and 6, the upper traveller 12' (or 22') is mounted in the plane of the third and fourth pivots. However, in the embodiments of FIGS. 7–9 the traveller is mounted in a plane normal to the plane of the third and fourth pivots for straight line movement toward and away from the members supporting the third and fourth pivots.

The advantage of this particular form of linkage is in supporting a weight from fixed pivots with an equal balance (neutral equilibrium) for the straight-line distance of movement. Another advantage is in retaining the straight line of motion when variations are made for particular applications.

As pointed out above, the proportions and positioning of linkages can be readily altered provided the same precise system, outlined above, is used to determine the relative length and location of each element, the precision points for mounting together directly or by way of connecting members, and the precise points for the fixed pivots in relation to the various links.

As is clear from the above, the elongated leg is coextensive with the hypotenuse of the set-up triangle when straight line motion is utilized for both horizontal and vertical directions in the same device. When the unit is constructed for horizontal movement alone the elongated leg will end at the second pivot such as pivot 34 FIG. 7. When constructed for vertical movement, the elongated leg will start at the first pivot such as pivot 23 of FIG. 6. The directions of movement as given do not preclude the use of deposition of the device in other positions which would alter the horizontal and vertical directions.

As pointed out above, the length of the first arm 15 plus the distance between the pivots 13 and 14 equals the length of the supporting arm 17 plus the distance between the fixed pivots 16 and 18. Therefore, the linking elements will converge into a straight line (when traveller 12' is in the position shown in phantom in FIG. 2) and upon continued movement the horizontal tracing point 12 can pass to the opposite side from the first position as shown in FIG. 2.

For large units, additional legs and supporting arms may be utilized by repeating the instructions utilized to form the simplified unit discussed above. Constructions of this type are shown and discussed below.

Although as pointed out below the distance along the hypotenuse of the triangle selected need not be the midpoint of the hypotenuse (and generally will not be for the second selected distance), nevertheless the greatest distance of straight line travel is obtained by selecting points close to the mid-point of the hypotenuse.

Moving on to FIG. 10, what is shown is a multiple connection of units such as that of FIG. 6. Such a construction provides a set-up in "gang" fashion useful for punching or stamping operations. The device includes a first elongated leg 121 connected to a traveller 122' at a suitable pivot point. The elongated leg 121 is supported by a first supporting arm 125 and a second supporting arm 127 each mounted on a suitable base by fixed pivots 126 and 128 respectively. The arms are connected to the elongated leg 121 by the pivots 123 and 124. At the other end of the device is another elongated leg 121' supported by arms 125' and 127', the spacing and length of the arms 125 and 125' being the same, as well as the spacing and length of the arms 127 and 127', and the elongated legs 121 and 121'. Accordingly, corresponding pivots 123' and $124_2$ are provided.

A pair of elongated parallel connectors 129 and 130 are provided between, respectively, pivots 123 and 123' and between pivots 124 and 124'. Accordingly, along the length of these connectors 129 and 130, of equal length, may be provided additional elongated legs 121'', 121''', etc., all of which are parallel to and of an equal length with the elongated legs 121 and 121'.

The device of FIG. 10 could be altered slightly by eliminating the leg 121 (and/or leg 121') and it would still function in precisely the same manner. In this instance, of course, the traveller would not be located at the vertex of the constructing triangle, but would lie in the plane of such vertex.

The device of FIG. 11 is somewhat analogous to that of FIG. 10 in the sense that two simplified devices interconnected by connector bars are utilized for the support of a traveller. Such a device is useful for horizontal straight line movement with complete clearance between base support points. In this device legs 131, 131', and 131'' are provided. These are all parallel, but are not of equal length because the bottom portions of legs 131 and 131'' are not necessary. The bottom portion of elongated leg 131' is necessary and does carry the traveller 132 which swings back and forth in a horizontal plane between the supports 136 and 136'. The leg 131 is supported at a first pivot 133 by a first supporting arm 135, and at a second pivot 134 by a second supporting arm 137, the second supporting arm 137 being mounted on a base at pivot 138. The elongated leg 131'' is supported in precisely the same manner by supporting arms 135' and 137' of length and spacing precisely the same as that of arms 135 and 137. The elongated leg 131' is carried indirectly by elongated connector bars 139 and 140, such connector bars being parallel to one another (and preferably of equal length) and passing between pivots 133 and 133', and between 134 and 134' respectively. The elongated leg 131' is mounted to the connector bars 139 and 140 by suitable pivots as shown.

Figure 12:
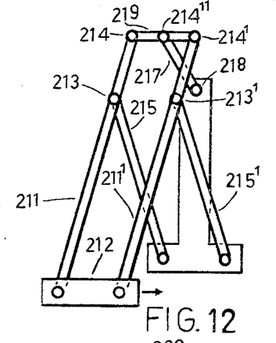
FIG. 12 is an embodiment of the present invention utilizing two units linked together.
Figure 16:
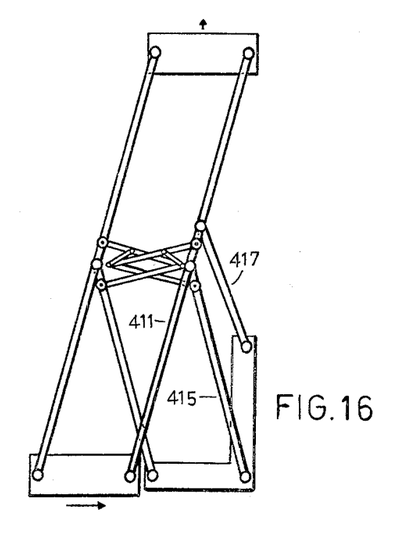
FIG. 16 shows another embodiment of the invention constituting as a part thereof a straight line motion device shown in FIG. 4 of copending application Ser. No. 601,096.
Figure 17:
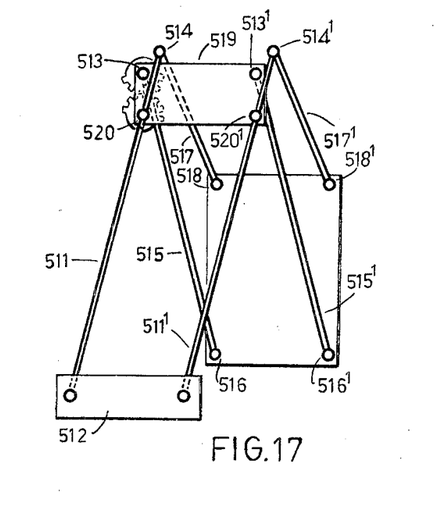
FIG. 17 shows another embodiment utilizing as a part thereof a straight line motion device similar to that shown in FIG. 5 of copending application Ser. No. 601,096.

Rigid support for a traveller is provided by the use of an additional elongated leg and at least one additional supporting arm in a manner to form parallelogram linkages as shown in FIGS. 12, 16 and 17.

The embodiment of FIG. 12 shows two units linked together for rigid mounting of a traveler, with the use of only one second supporting arm for both parallel units, the second supporting arm being attached to both units through a connector bar. Here a pivoted traveller 212 is provided attached to two separate elongated legs 211 and 211'. A first supporting arm 215 is provided for the first elongated leg 211 and a first pivot 213. An elongated connector bar 219 is pivotally mounted between the first elongated leg 211 and the second elongated leg 211' (such legs being parallel), the pivotal mounting between the connector bar 219 and the first leg constituting a second pivot 214. A second supporting arm 217 is pivotally mounted along the connector bar 219 between the first and second legs 211 and 211' at a pivot 214". A third supporting arm 215' is mounted to the second leg 211' at a third pivot point 213' spaced from the connector bar 219 the same distance as the pivot 213 on the first leg 211. The third arm 215' is parallel to and of equal length to the first arm 211. In addition, the pivotal connection of the connector bar 219 and the second leg 211' constitutes a fourth pivot 214'.

The relative lengths of the first and second arm and the distance between the first and second pivots and the pivots of the first and second arms of the support are determined in the same manner as that above. When the second arm 217 has been determined, it need only be slid over along the connector bar 219 between the two legs 211 and 211', preferably to approximately the mid-point of the connector bar so as to place the pivot 218 a distance from its theoretical location (before movement) equal to the spacing between pivots 214 and 214" along the line parallel to the connector bar 219.

Figure 13:
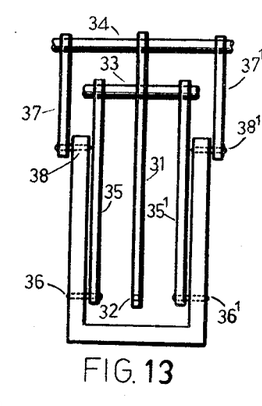
FIG. 13 is an end view of a device such as shown in FIG. 7 showing how the various elements clear one another.

FIG. 13 is an end view of FIG. 7 showing how the various elements clear one another. As may be seen, the pivots 33 and 34 may comprise axles, and for additional support additional supporting arms 35' and 37' may be used. The device is illustrated in neutral position where the elongated leg and supporting arms are parallel with one another. This device is analogous to that of FIG. 11 in the sense that two simple units are inter-connected for the support of a traveller therebetween; however unlike the FIG. 11 device where the leg 131' is supported by connector bars 139 and 140 which in turn are supported by the arms placed along but out of reach of the straight line movement of the traveller, the FIG. 13 device has the leg 31 supported by axles 33 and 34 which in turn are supported by the arms being placed on each side of the straight line path for the traveller 32, the traveller passing between the supporting arms. Such a device is useful for horizontal straight line movement with side clearance from the base support member and for vertical straight line movement where a repeated jar or shock in the operating of the device would tend to lossen or deform a pivot. The drawing is for horizontal movement but as is clear the upper part of the elongated leg could be added for vertical movement of traveller.

Figure 14:
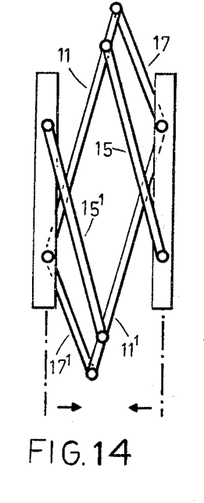
FIG. 14 shows an embodiment of the present invention wherein two units are combined with one in a reverse position.

FIG. 14 shows two simple units combined with one in a reverse position. This device is useful as a contracting and expanding unit such as a gate. Additional supporting arms can be placed between the parallel arms and legs or extensions thereof as desired, provided they have an identical parallel relationship with the other supporting arms.

Figure 15:
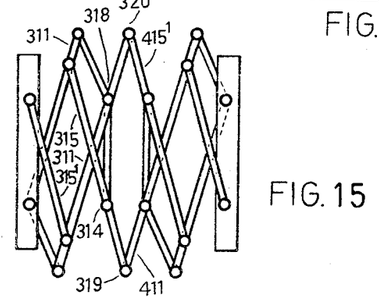
FIG. 15 shows another embodiment of the present invention where two units such as those of FIG. 14 are provided to produce a contracting and expanding unit.

FIG. 15 is an embodiment including two units such as that illustrated in FIG. 14 connected together for a contracting and expanding unit. The FIG. 14 units are combined so as to force them to operate in concert. This is in contradiction to the manner of combining the units in FIG. 6 of Patent 3,291,431 wherein each section can operate independently of the other section. Thus, in FIG. 15 the elongated leg 311' and the supporting arm 315 are extended beyond the pivots 318 and 314, respectively, a distance equal to one another. The second unit is similarly extended, it being noted that the extended elongated leg 411 meets the extended supporting arm 315 at a pivot 319, and the extended supporting arm 415' meets the extended elongated leg 311' at a pivot 320.

The embodiment of FIG. 16 constitutes an improvement to the device shown in FIG. 4 of copending application Ser. No. 601,096 and the description of such FIG. 4 embodiment is hereby incorporated by reference. What is referred to as the "second arm" in FIG. 4 of copending application Ser. No. 601,096 here constitutes the first supporting arm 415, while what is referred to in FIG. 4 of Ser. No. 601,096 as the "fourth arm" in the present application constitutes the elongated leg 411. What is added to the structure of FIG. 4 of Ser. No. 601,096 in the present invention is the second supporting arm 417. The addition of the second supporting arm 417 constitutes an improvement as this supporting arm greatly reinforces the structure, although the distance of straight line movement is somewhat reduced.

It is accordingly seen that the straight line carrier device of Patent 3,291,431 and application Ser. No. 601,096 contain linkages corresponding to the elongated leg and first supporting arm of the present invention. However, the second supporting arm, in its precise relation to the first supporting arm and elongated leg, can be attached to and become a support to sustain the weight of the traveller for the devices of Patent 3,291,431 and application Ser. No. 601,096. The addition of this second supporting arm does somewhat restrict the distance of straight line travel, but this sacrifice of distance is warranted in many cases by the great additional strength provided.

FIG. 17 shows another embodiment of the present invention. This structure is basically constructed of two of the simplified units of FIG. 7, and is further similar to FIG. 5 of copending application Ser. No. 601,096. Thus, with the addition of two second supporting arms to the FIG. 5 embodiment of Ser. No. 601,096, the devices would be the same except that in FIG. 17 the cog wheels have been located above one another (rather than side by side) and a connector plate is used in place of the element in FIG. 5 connecting the centers of the cog wheels and referred to as "rod 432." The change provided in FIG. 17 raises the base to a higher level and affords the traveller a clear path beneath the base pivots. It will be understood, of course, that the cog wheels are not really necessary since the plate provides a rigid elongated connector holding all the various pivots in their proper relationship. The cog wheels do, however, maintain alignment at the neutral position.

Considering FIG. 17 in greater detail, a traveller 512 is provided for moving in a straight horizontal line. A pair of elongated legs 511 and 511', of equal length and parallel, serve to carry such traveller. A connector plate 519 is provided along the length of both elongated legs and is pivotally mounted to both at pivots 520 and 520', respectively. A pair of first supporting arms 515 and 515' are in turn mounted to the connector plate 519 at respective first pivots 513 and 513'. A pair of second supporting arms 517 and 517' are mounted to the respective elongated legs 511 and 511' at second respective pivots 514 and 514'. The supporting arms 515 and 515' are mounted to a support at pivots 516 and 516' and, similarly, the second supporting arms 517 and 517' are mounted to the support at respective pivots 518 and 518'.

The device of FIG. 17 is constructed precisely in the same manner as the other devices, disclosed above. However, as a final step the pivots 513 and 520 (and 513' and 520') are separated by moving the first support arms 515 and 515' vertically upwardly while maintaining their angular inclination (it being understood that during construction with the above formula the pivots 513 and 520, as well as the pivots 513' and 520' would be co-axial).

It will be understood that the movement and support of the supporting arms 515 and 515' at the pivots 513 and 513', respectively, are identical to the movement and supports that would be provided if these support arms were disposed lower and were directly mounted at pivots 520 and 520', respectively.

The cog wheels, which are not essential in the FIG. 17 embodiment, are rigidly mounted, respectively, to the elongated leg 511 and the first support arm 515, and are permitted to freely pivot with respect to the plate 519.

FIGS. 18–21 illustrate the path of a traveller after transcribing the straight-line distance of travel.

Figure 18:
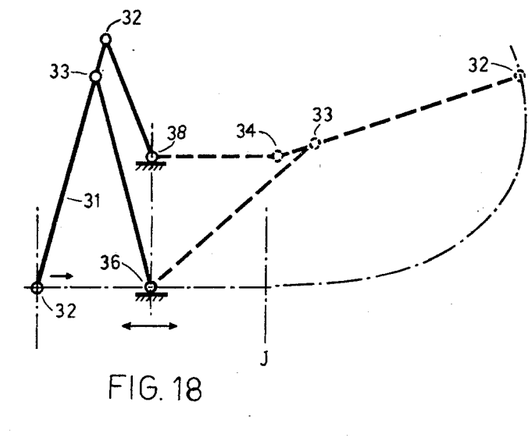
FIGS. 18-21 are representations showing the path of a traveller after transcribing the straight line distance of travel.

Reference is had to FIG. 7 for a comparison with FIG. 18. Thus, if the traveller 32 in FIG. 18 is permitted to clear the pivot support 36 and the elongated leg 31 permitted to clear the pivot support 38 the ultimate path of travel will be as shown by the chain line, the straight line movement being limited to the distance shown by line J.

Figure 19:
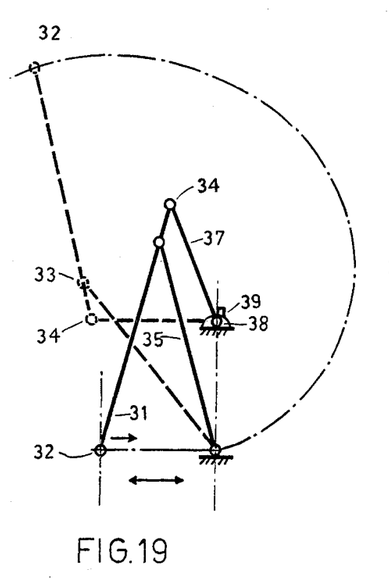

In FIG. 19 a stop 39 is provided and the path of movement of the traveller is controlled as illustrated. The stop 39 at the fixed pivot 38 causes a reverse in the direction of the support arms 35 and 37 on reaching the neutral position while the leg 31 continues its stroke. This results in a curved path from the neutral position. Such curve is greater at the inception point than the normal curve of FIG. 18 and such a movement is useful for quick engagement or release of an object being moved on a straight path.

Figure 20:
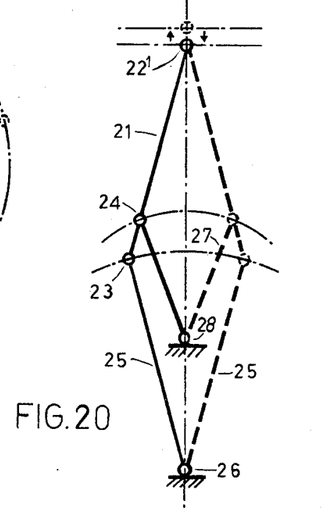

FIG. 20 may be compared to FIG. 6 for vertical movement. FIG. 20 shows a reciprocating straight-line output movement generated by a continuous input stroke. This structure could be used for a quick operation where a product is on a moving conveyor belt.

Figure 21:
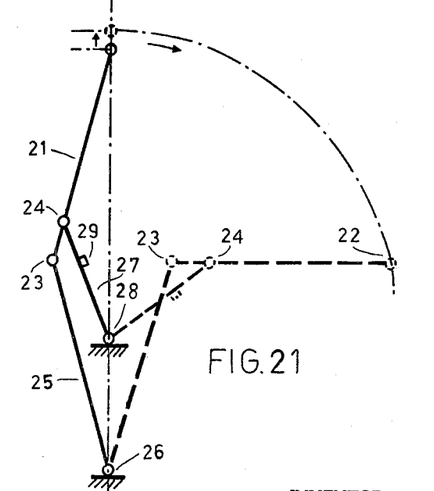

FIG. 21 is similar to FIG. 20, but with the addition of a stop 29 attached to arm 27 to cause a reverse in the direction of leg 21 on the free pivots 24 and 23. At the neutral position the points of straight line movement of the traveller 22' is arched directly off the straight line path. This type of device would be good for operating an arm to remove and hold out of place a lid for a step-on type of garbage container.

Figure 22:
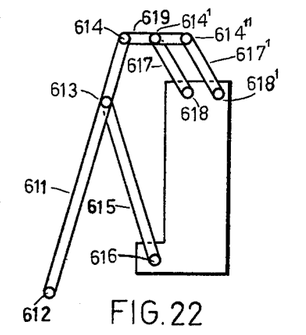
FIGS. 22-27 are other embodiments utilizing principals of the present invention.
Figure 23:
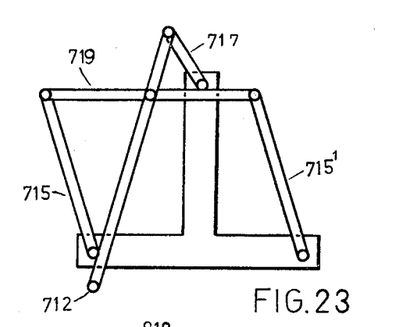
Figure 24:
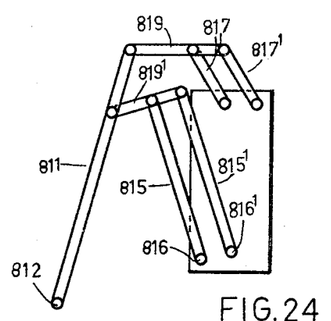
Figure 25:
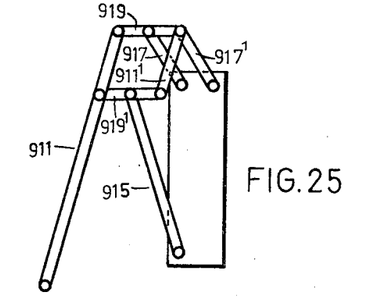
Figure 26:
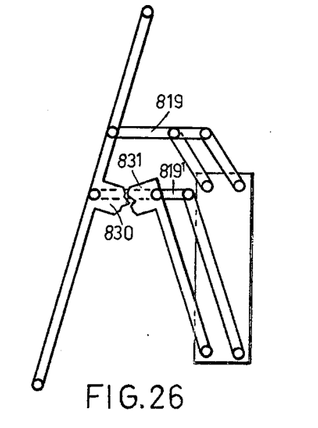

FIG. 22 shows a variation of the simple structure of FIG. 9, the FIG. 22 embodiment having the second supporting arm "moved over" in a parallel position in the same manner as the second arm 217 in FIG. 12. Of course, the first arm rather than the second arm may be moved over in a parallel position and this is shown in FIG. 23; or they may both be moved over as shown in FIGS. 24, 25 and 26. Where this is done, however, it is necessary to provide suitable means for maintaining the proper parallelism, such as means for maintaining the connecting member during movement in a plane parallel to its original plane of location and in FIGS. 22 and 23 this constitutes a third arm equal in length and parallel to the second arm.

In more detail the device of FIG. 22 comprises a traveller 612 adapted to move in a straight horizontal line, an elongated leg 611 for carrying the traveller 612, a first supporting arm 615 mounted to the leg 611 at a first pivot 613, a connecting bar 619 mounted to the leg 611 at a second pivot 614, a second supporting arm 617 mounted to the connecting bar 619 at a pivot 614', and a third supporting arm 617' mounted to the connecting bar 619 at a pivot 614". The arms 615, 617 and 617' are all, in turn, connected to a support member at 3rd, 4th and 5th pivots 616, 618, 618', respectively; and the second and third arms 617 and 617' are of equal length and mounted parallel to form a parallelogram with part of the support member and connecting bar 619 to maintain the connecting bar in its proper attitude with respect to the leg 611. The relative lengths of the first and second arms 615 and 617 and the distance between the first and second pivots 613 and 614 are determined in the usual manner described above.

FIG. 23 is similar to FIG. 22 except that it is the first arm 715 which is "moved over" rather than the second arm 717. A third arm 715' of equal length and mounted parallel to the first arm 715 is accordingly provided to maintain the proper parallelism by providing, with first arm 715, two opposite sides of a parallelogram, the connector 719 and part of the support forming the other two opposite sides. Once again, the traveller 712 will move in a straight horizontal path.

FIG. 24 shows two additional features: both the first and second supporting arms may be "moved over" and the "movement over" of the supporting arms in construction of the device need not be parallel to the line of movement of the traveller during use. In this embodiment the second and fourth arms 817 and 817' are mounted to the leg 811 indirectly by way of a connector bar 819 as described above with respect to FIG. 22. In addition the first arm 815 is also "moved over" along a second connector bar 819' thereby requiring further parallelism retaining means, here provided as a third arm 815' similar to the FIG. 23 embodiment. Because the first and third arms 815 and 815' form two opposite sides of a parallelogram with the other opposite sides formed by parts of the connector 819' and the support between the support pivots 816 and 816', the "movement over" during construction need not be parallel to the line of movement during use of the traveller 812. The second connector bar 819' being on an angle in the direction from the horizontal path of traveller provides an additional clearance between the traveller and pivots 816 and 816'.

FIG. 25 shows a variation of the device of FIG. 24, but using a second leg 911' (as in FIGS. 10–12, 16 and 17) to maintain the necessary parallelism. Here, because the connectors 919 and 919' are maintained parallel (contrary to FIG. 24) by the legs 911 and 911' to provide a first parallelogram, no fourth supporting arm is necessary to maintain the proper position and attitude of the "moved over" first arm 915. As in the embodiment of FIGS. 22 and 24, the "moved over" second arm 917 is maintained in position by an equal and parallel third arm 917' which provides a second parallelogram therewith.

The relative movement between the elongated leg and the supporting arms is normally in a clockwise and counterclockwise direction. However at the neutral position a contradicting direction can be initiated as shown in FIG. 19 and FIG. 21. This dead point of rigid support is overcome in some situations by the weight and speed of the traveller or by the placement of the input stroke. In other situations, such a slow movement of traveller with the traveller providing the input stroke, the various means of maintaining the alignment in my Patent 3,291,-431 and application Ser. No. 601,096 can be utilized. This requires the use of a connecting member and at least one additional parallelogram linkage as illustrated in FIG. 16 and FIG. 17. Also the mid-point of the elongated leg is used for one supporting arm to provide an equal clockwise and counterclockwise movement so that the means to maintain alignment can function properly. The expanding unit of FIG. 16 (see Ser. No. 601,096 FIG. 4) and the cog wheels of FIG. 17 will only permit a clockwise and counterclockwise movement about the pivoting of the supporting arm to the elongated leg and this will support the device in its normal direction of movement at the neutral position.

These means to maintain alignment in my previous applications serve to maintain alignment throughout the reciprocating stroke. In the present device additional alignment means may be required only at the dead center point of the stroke (or neutral position). This will also permit the device to be used for movement of the traveller beyond the distance of the straight line path, as illustrated in FIG. 18. This can be accomplished by providing a pinion 830 and a receiving socket 831 as shown in FIG. 26, which is otherwise similar to FIG. 24 except that the connections 819 and 819' are parallel. The tooth and socket are formed to or pinned to the linkages in a position to mesh at the center point of the reciprocating stroke. Another advantage of the pinion and socket is that slight variation in the distances between one and its axis in relation to the distance between the other one and its axis can compensate for and allow a variation in proportions of the linkages as explained for the construction of the device.

Figure 27:
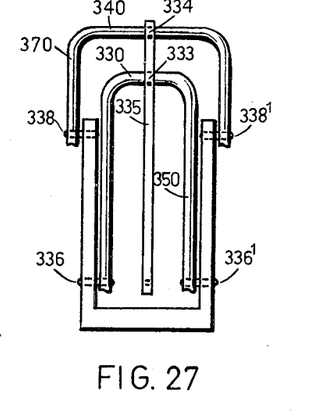

FIG. 27 is an end view similar to FIG. 13. Here, the pivots are formed as bent extensions of the arm. Thus, the center portion 330 of first supporting arm 350 serves as an axle similar to the axle 33 of FIG. 13. Similarly, the center portion 340 of second supporting arm 370 serves as an axle similar to the axle 34 of FIG. 13. The arms 350 and 370 being rotatable connected to the elongated leg 335 at pivot points 333 and 334 and to the support member 312 at pivots 336/336' and 338/338' respectively. Vertical length of the opposing sides of arm 350 are equal to one another and opposing sides of arm 370 are equal in length. The horizontal lengths of arms 350 and 370 being of a given length. The distance between the pivot point 333 on a line perpendicular to a line passing through pivots 336 and 336', the distance between the pivot point 334 on a line perpendicular to a line passing through pivots 338 and 338', the distance between pivot points 333 and 334, and the distance between the pivots 336/336' and 338/338' being determined in the same precise manner as described for all preceding embodiments.

The foregoing description of certain specific embodiments will so fully reveal the general nature of the invention that others can, by applying current knowledge, readily modify such specific embodiments and/or adapt them for various applications without departing from the generic concept. For example, while the lowermost arm of the above devices are described as the first arm and the upper arm as the second arm, it will be understood that these are arbitrary designations and may be reversed; also the devices may be used in attitudes other than those shown.

What is claimed is:
1. A linkage device for translating straight line motion, comprising:
   (a) at least one traveller adapted to move in a straight line;
   (b) an elongated leg for carrying said traveller;
   (c) a first supporting arm mounted to said elongated leg at a first pivot along the length of said leg;
   (d) a second supporting arm mounted to said elongated leg at a second pivot along the length of said leg spaced from the first pivot;
   (e) and a support member to which said first and second supporting arms are respectively connected at third and fourth pivots spaced from each other;
      (1) at least a portion of said support member forming at least a part of the long side of a right angle triangle having longer and shorter mutually perpendicular sides and a hypotenuse defining acute angles with said sides respectively, one of the acute angles ranging from 75° to 80°,
      (2) said elongated leg forming at least a part of said hypotenuse,
      (3) said traveller being mounted on said elongated leg at one of the acute angles of said triangle,
      (4) said first pivot being located at a first point which is approximately the midpoint of said hypotenuse,
      (5) said third pivot being located at a third point which is the point of intersection of a perpendicular bisector of a first line with the long side of said triangle, said first line terminating at opposite ends at said first point and at a second point, said second point being located along the length of the longer side of the triangle a distance from said shorter side to equal the spacing of said first pivot along hypotenuse from shorter side of said triangle,
      (6) said second pivot being located at a fourth point which is located on said hypotenuse a certain distance greater than the said first point one half the hypotenuse from said shorter side,
      (7) said fourth pivot being located at a sixth point which is the point of intersection of a perpendicular bisector of a second line with the long side of said triangle, said second line terminating at opposite ends at said fourth point and at a fifth point located on said longer side a distance from the shorter side equal to said certain distance.

2. A device in accordance with claim 1 wherein said traveller is mounted on said elongated leg in the plane of said third and fourth pivots.

3. A device in accordance with claim 1 wherein said traveller is mounted on said elongated leg in a plane normal to the plane of said third and fourth pivots for straight-line movement toward and away from said support member.

4. A device in accordance with claim 1 wherein said third pivot between said first supporting arm and said support member is located along an extension of the long side of said right angle triangle.

5. A device in accordance with claim 1 wherein said third pivot between said first supporting arm and said support member is located at the right angle vertex of said right angle triangle.

6. A device in accordance with claim 1 wherein said third pivot between said first supporting arm and said support member lies along the long side of said right angle triangle above the right angle vertex of said right angle triangle.

7. A device in accordance with claim 1 further comprising a second elongated leg parallel to said first elongated leg; corresponding pivots on said second elongated leg corresponding to the location of said first and second pivots on said first leg; first and second parallel connectors respectively connected between said first and second pivots on said first leg and the corresponding pivots on said second leg; a third supporting arm pivoted to said second leg at one of said pivots and parallel to the corresponding supporting arm which is pivoted to the corresponding pivot on said first elongated leg; said third supporting arm being connected to a stationary support member.

8. A device in accordance with claim 1, said traveller being mounted on said second leg.

9. A device in accordance with claim 1, wherein said further comprising a second elongated leg is pivoted to third and fourth supporting arms; and wherein said first and second legs, said first and third arms and said second and fourth arms are respectively parallel and of equal length and spacing; and a third leg parallel to said first and second legs mounted along said parallel elongated connectors at fifth and sixth pivots, respectively, said fifth pivot being spaced along said first elongated connector a distance equal to the spacing of said sixth pivot from said second pivot along said second elongated connector and said leg being parallel to said first leg, said traveller being mounted on said third leg.

10. A device in accordance with claim 1, wherein said first and second supporting arms are shaped to form three sides of a rectangle, each arm having opposing sides of equal lengths and the third sides being of given lengths, whereas said third sides are pivotally connected to said elongated leg.

11. A linkage device for translating straight line motion, comprising:
   (a) at least one traveller adapted to move in a straight line;
   (b) an elongated leg for carrying said traveller;
   (c) a connecting member located in a plane and pivotally connected to said elongated leg at a first pivotal point along the length of said leg;
   (d) a first supporting arm mounted to said connecting member at a first pivot spaced a certain distance from said first pivotal point;

(e) a second supporting arm pivotally mounted to said elongated leg at a second pivotal point along the length of said leg and spaced from said first pivotal point;

(f) a support member to which said first and second supporting arms are respectively connected at second and third pivots spaced from one another; and (g) means for maintaining said connecting member in a plane parallel the first named plane during movement of said leg, said means comprising a third supporting arm identical in length to said first supporting arm, parallel thereto and pivotally connected to said connecting member, said support member being spaced a given distance from said first supporting arm, whereby said first and third arms define opposite sides of a parralelogram.

12. A device in accordance with claim 11, wherein the last named means further comprises a second elongated leg identical in length at least in the spacing apart of said first and second pivotal points on the first named elongated leg, and disposed parallel to said first leg, said second leg being pivotally connected to said connecting member and spaced from the first named leg; and a fourth supporting arm identical in length to said second supporting arm, parallel thereto, and pivotally connected to said second elongated leg at a pivot corresponding to said second pivotal point on said first elongated leg, said fourth arm also being pivotally connected to said support member, whereby said second and fourth supporting arms define opposite sides of a parallelogram.

13. A device in accordance with claim 11, further comprising a pair of interlocking cog wheels one of which is mounted at said first pivotal point and anchored to said elongated leg and the other of which is mounted at said first pivot and rigidly anchored to said first supporting arm.

14. A linkage device for translating straight line motion, comprising:
(a) at least one traveller adapted to move in a straight line;
(b) an elongated leg for carrying said traveller;
(c) a first supporting arm pivotally mounted to said elongated leg at a first pivotal point along the length of said leg;
(d) a connecting member located in a plane and pivotally connected to said elongated leg at a second and different pivotal point along the length from said pivotal point;
(e) a second supporting arm mounted to said connecting member at a first pivot spaced given distance from second pivotal point;
(f) a support member to which said first and second supporting arms are respectively connected at second and third pivots; and
(g) means for maintaining said connecting member in a plane parallel to the first named plane during movement thereof, said means comprising a third supporting arm identical in length to said second supporting arm, disposed parallel thereto, and pivotally connected to said connecting member, said support member being spaced a given distance from said second supporting arm, whereby said second and third arm define opposite sides of a parallelogram.

15. A device in accordance with claim 14, wherein the last named means further comprises a second elongated leg identical in length at least in the spacing apart of said first and second pivotal points to the first named elongated leg, said second leg being disposed parallel to the first named leg, pivotally connected to said connecting member, and spaced from the first named leg; and a fourth supporting arm identical in length to said first supporting arm, parallel thereto, and pivotally connected to said second elongated leg at a pivot corresponding to said first pivotal point on the first named elongated leg, and also pivotally connected to said support member, whereby said first and fourth supporting arms define opposite sides of a parallelogram.

16. A linkage device for translating straight line motion, comprising:
(a) at least one traveller adapted to move in a straight line;
(b) an elongated leg for carrying said traveller;
(c) a first connecting member movable in a plane and pivotally connected to said elongated leg at a first pivotal point along the length of said leg;
(d) a second connecting member movable in said plane and pivotally connected to said elongated leg at a second pivotal point along said leg spaced from the first pivotal point;
(e) a first supporting arm mounted to said first connecting member at a first pivot spaced from said first pivotal point;
(f) a second supporting arm mounted to said second connecting member at a second pivot spaced from said second pivotal point;
(g) a support member to which said first and second supporting arms are respectively connected at third and fourth pivots spaced from each other; and
(h) means for maintaining said first and second connecting members in said poane during movement thereof, said means comprising
(1) a third supporting arm identical in length to the one of the first and second supporting arms, said third arm being disposed parallel to said one of the supporting arms and pivotally connected to one of the connecting members, said supporting member being spaced from said first supporting arm, so that said first and third arms define opposite sides of a parallelogram, and
(2) a fourth supporting arm identical in length to the other of said supporting arms, said fourth arm being disposed parallel to said other supporting arm and pivotally connected to the other of said connecting members, said support member being spaced from said second supporting arm, whereby the second and fourth arms define opposite sides of another parallelogram.

17. A device in accordance with claim 16 wherein the elongated leg adjacent said first pivotal point has an extension thereon extending toward said first pivot, and wherein said first supporting arm has an extension thereon adjacent said first pivot and extending toward said first pivotal point 1 said extension having meshing faces at a point between said first pivotal point and said first pivot, one of said extensions having a tooth extending therefrom and the other of said extensions having a socket therein adapted to receive said tooth for rocking movement between said extensions.

18. A device in accordance with claim 16, further comprising a second elongated leg identical in length at least in the spacing apart of said first and second pivotal points to the first named elongated leg, said second leg being spaced from said first named elongated leg and parallel thereto, said second elongated leg being pivotally connected to said first and second connecting members.

19. A linkage device for translating straight line motion, comprising:
(a) an elongated leg with at least one tracing point adapted for support of a traveller;
(b) a first supporting arm pivotally mounted to said elongated leg at a first point thereon;
(c) a second supporting arm pivotally mounted to said elongated leg at a second point along said leg spaced from the first point; and
(d) a support member to which said first and second supporting arms are respectively pivotally connected at third and fourth points spaced apart from each other, said third and fourth points being located on a line that is perpendicular to the straight line path as transcribed by said tracing point.

References Cited

UNITED STATES PATENTS

| | | | |
|---|---|---|---|
| 1,579,170 | 3/1926 | Wilkinson et al. | 74—103 X |
| 1,664,364 | 3/1928 | Jensen et al. | 74—103 |
| 2,152,762 | 4/1939 | Humphrey | 74—103 |
| 2,683,481 | 7/1954 | Lorenz | 74—103 X |

ROY D. FRAZIER, Primary Examiner

J. FRANKLIN FOSS, Assistant Examiner

U.S. Cl. X.R.

74—103; 248—277